(12) United States Patent
Zeng et al.

(10) Patent No.: US 12,515,007 B2
(45) Date of Patent: Jan. 6, 2026

(54) HEATING AND HUMIDIFYING DEVICE AND HEATING AND HUMIDIFYING METHOD THEREOF

(71) Applicant: SHAOXING UNDIS MEDICAL TECHNOLOGY CO., LTD., Zhejiang (CN)

(72) Inventors: Xiaojian Zeng, Hunan (CN); Lei Li, Hunan (CN)

( * ) Notice: Subject to any disclaimer, the term of this patent is extended or adjusted under 35 U.S.C. 154(b) by 752 days.

(21) Appl. No.: 17/911,710

(22) PCT Filed: Mar. 11, 2021

(86) PCT No.: PCT/CN2021/080247
§ 371 (c)(1),
(2) Date: Sep. 15, 2022

(87) PCT Pub. No.: WO2021/185148
PCT Pub. Date: Sep. 23, 2021

(65) Prior Publication Data
US 2023/0310788 A1    Oct. 5, 2023

(30) Foreign Application Priority Data

Mar. 18, 2020  (CN) .......................... 202010190848.0

(51) Int. Cl.
*A61M 16/16*    (2006.01)
*A61M 16/00*    (2006.01)
(Continued)

(52) U.S. Cl.
CPC ........ *A61M 16/16* (2013.01); *A61M 16/0833* (2014.02); *A61M 16/1075* (2013.01);
(Continued)

(58) Field of Classification Search
CPC ............ A61M 16/109; A61M 16/1095; A61M 16/147; A61M 16/16; A61M 16/161;
(Continued)

(56) References Cited

U.S. PATENT DOCUMENTS

| | | | | |
|---|---|---|---|---|
| 4,201,204 A | * | 5/1980 | Rinne ................. | A61M 16/109 261/130 |
| 2019/0134342 A1 | * | 5/2019 | Nitta .................... | A61M 11/005 |
| 2021/0283357 A1 | * | 9/2021 | Leonard ............ | A61M 16/1005 |

FOREIGN PATENT DOCUMENTS

| | | | | |
|---|---|---|---|---|
| CN | 110585548 A | * | 12/2019 | .......... A61M 16/161 |
| CN | 211357307 U | * | 8/2020 | ............ A61M 16/16 |

(Continued)

*Primary Examiner* — Joseph D. Boecker (57) ABSTRACT

A heating and humidifying device and a heating and humidifying method. The heating and humidifying device comprises a housing (1), a water tank atomizing set, a steam generator, a heating breathing pipeline, and a controller. A tank body (11) of the water tank atomizing set is buckled with a plurality of elastic pieces (5) in the housing by means of buckling strips on the outer side wall of the water tank atomizing set; the steam generator is snap fit with grooves (8) on the two sides of the housing (1) by means of the buckling pieces (29) on the two sides; a mist outlet (13) on the tank body (11) of the water tank atomizing set is connected to a connector (38) of the steam generator; a gas outlet (28) on the steam generator is connected to the heating breathing pipeline. The heating and humidifying method comprises the steps of: (1) water injecting atomization; (2) water mist gasifying; and (3) heat insulating and gas exhausting.

10 Claims, 4 Drawing Sheets

(51) Int. Cl.
*A61M 16/08* (2006.01)
*A61M 16/10* (2006.01)
*A61M 16/14* (2006.01)

(52) U.S. Cl.
CPC ........ *A61M 16/147* (2014.02); *A61M 16/161* (2014.02); *A61M 16/167* (2014.02); *A61M 16/024* (2017.08); *A61M 16/0875* (2013.01); *A61M 16/1095* (2014.02); *A61M 2205/3368* (2013.01); *A61M 2205/3653* (2013.01)

(58) Field of Classification Search
CPC .............. A61M 16/162; A61M 16/164; A61M 16/165; A61M 16/167; F24F 6/12
See application file for complete search history.

(56) References Cited

FOREIGN PATENT DOCUMENTS

| | | | | | |
|---|---|---|---|---|---|
| JP | 2013217592 | A | * 10/2013 | ................ | F24F 6/00 |
| JP | 2016044925 | A | * 4/2016 | ................ | F24F 6/00 |

* cited by examiner

HEATING AND HUMIDIFYING DEVICE AND HEATING AND HUMIDIFYING METHOD THEREOF

FIELD OF THE INVENTION

This invention relates to the technical field of medical equipment accessories and specifically relates to a heating and humidifying device and a heating and humidifying method thereof.

BACKGROUND OF THE INVENTION

Ventilator is a commonly used medical device during clinical treatments in the Division of Pneumology. If human body directly inhales dry and cold air coming out from the ventilator, various problems will occur, including dehydration in the respiratory tract, dry mucous membranes, inhibition or loss of ciliary movement, and thick secretions forming phlegm, which will cause phlegm accumulation, blocked trachea and secondary infection. Therefore, it is necessary to warm and humidify the gas coming out from the ventilator. The traditional heating and humidifying device consists of a hollow case in which medical distilled water is contained. A heating device is provided inside or at the bottom of the case. The upper part of the case is provided with a gas inlet pipe and a gas outlet pipe. Both pipes are suspended above the liquid surface. The gas coming out from the ventilator enters the case through the gas inlet pipe; the gas is then mixed with the water vapor generated by heating and is eventually discharged through the gas outlet pipe. This method is namely called the vapor humidification method.

This method of heating and humidifying has many defects:

1. It is uneasy to control the output of the humidification system (water vapor output per unit time: mg/l): In this method, the water vapor is mainly generated by heating the water tank by the heating plate, so that the water in the water tank evaporates and produces water vapor. The amount of water vaporized depends on many factors such as the temperature of the heating plate, the contact area between the heating plate and the water tank, and the thermal conductivity of the water tank material;
2. Low control accuracy and long response time: Since the evaporation rate is determined by the water temperature and the pressure in the water tank, more water is evaporated when the water temperature is higher, and less water is evaporated when the water temperature is lower. The rise in water temperature is due to transfer of heat from the heating plate to the water tank, and then from the water tank to the water, in which there is a huge loss of heat during conduction. The heat conduction response time is also long and it is difficult to achieve an accurate and real-time temperature and humidity control.
3. Too much condensed water in the pipeline: during heating by steam, the gas at the outlet of the water tank is oversaturated. For an ordinary pipeline, if the temperature of the gas to be sent to human body reaches 37° C., the gas needs to reach a higher temperature at the outlet of the water tank. When the gas in the pipeline cools down from a higher temperature to 37° C., a large amount of water vapor will condense and affects safety of patients. If heating pipelines are used, the amount of condensed water can be reduced, yet water vapor still condenses when the gas changes from oversaturation to saturation during movement in the pipeline.
4. The equipment is too large and too heavy for storage and transportation, which increases the difficulty of operation by medical personnel.

BRIEF SUMMARY OF THE INVENTION

To solve the above technical problem, the present invention provides a heating and humidifying device and a humidifying method thereof. The present invention replenishes water into a water tank and atomizes the water automatically, preheats the gas subsequently breathed by the patient and mixing the preheated gas with atomized water droplets, vaporizing the water droplets and outputting the vaporized water droplets along with the gas as steam, and communicating the steam to the patient through a pipeline which is capable of being heated; during movement of the steam in the pipeline to the patient, the temperature and humidity of the steam are monitored in real time, such that the steam, when being at the patient's end, will have a suitable temperature and a relative humidity that is close to saturation, The present invention provides adjustments in accordance with real time feedback to ensure preserved heat of the steam when being used by the patient, achieves precise control of humidification, short heating time, and prevents condensed water from being formed in the pipe.

To solve the technical problem, the present invention provides the following technical solutions:

A heating and humidifying device, comprising a case, a water tank atomization set, a steam generator, a heating breathing pipeline and a controller; a tank body of the water tank atomization set is buckled with resilient buckling pieces inside the case via corresponding buckling strips on an outer side wall of the tank body; the steam generator is buckled with slots on two sides of the case via buckling pieces on two sides of the steam generator respectively; a mist outlet on the tank body of the water tank atomization set is interfaced with a connector of the steam generator; a gas outlet on the steam generator is connected to the heating breathing pipeline;

a protruding piece on one side of the tank body is buckled with a buckling slot on the case; an outer side of an end of the mist outlet is sleeved with a sealing ring, and an atomizing film is sleeved in the sealing ring; one side of the atomizing film is padded with a top block; and the tank body is connected to a tank cover by threads; a lower surface of the tank cover is provided with a water stop column; a water supply pipe passes through the tank cover and communicates with the water stop column; a sleeve column on a floating upper cover is sleeved inside the water stop column, and a floating lower cover is provided under the floating upper cover;

the steam generator has an internal layer and an external layer separated from each other; one side of an evaporation chamber of the steam generator is open, and an inner chamber sheet is annularly provided in the evaporation chamber interior to the internal layer; the inner chamber sheet is provided with a gas passage at an opening side of the evaporation chamber, and the evaporation chamber is connected to a gas inlet; the inner chamber sheet is connected to a gas outlet; an end cover is provided on the opening side of the evaporation chamber; a socket is provided on the end cover; and a heating device is provided on one side of the end cover;

the gas outlet of the steam generator is connected with a quick connector at a proximal end of a pipe body of the heating breathing pipeline; a Y-shaped connector at a far end of the heated breathing pipeline is configured to be connected with a patient; the pipe body is provided with heating wires; temperature and humidity monitoring holes are provided on the quick connector and the Y-shaped connector respectively; the temperature and humidity monitoring holes are connected with a temperature and humidity sensor on the controller in the case: the temperature and humidity monitoring holes on the quick connector and the Y-shaped connector provide real-time feedback on steam temperature and humidity, and the controller controls power of the heating wires of the pipe body, an amount of atomized water from the atomizing film, and a power of the heating device, so as to obtain the steam with suitable temperature and humidity.

Preferably, an inner wall of the water stop column below the tank cover is annularly provided with a thickened step; an annular sheet is provided under the water stop column; an inner hole of the annular sheet is provided with toothed openings; and the sleeve column of the floating upper cover is provided with two limiting teeth corresponding to the toothed openings; an upper end of the sleeve column is provided with a plug; a cushion pad is provided on the top of the plug; the limiting teeth on the sleeve column pass through the toothed openings and are placed between the annular sheet and the thickened step.

Preferably, the evaporation chamber is placed between two clips at an opening of the case; the buckling pieces are provided on both sides of the evaporation chamber respectively; the buckling pieces are buckled with first teeth on the slots on both sides of case through second teeth of the buckling pieces; the evaporation chamber is placed in the case; an edge at an end of the inner chamber sheet is buckled with a slot on the end cover; the heating device is placed interior to the inner chamber sheet, and separation sheets are provided at both sides of the inner chamber sheet respectively to separate the inner chamber sheet from the evaporation chamber; the separation sheets define gaps between the evaporation chamber and the inner chamber sheet; and an interior of the evaporation chamber is hollow.

Preferably, limiting pieces are symmetrically provided inside the case, and the limiting pieces are symmetrically provided with grooves; a gap is provided between two limiting pieces; the mist outlet of the tank body is placed in the gap; both sides of a wiring part are buckled with the grooves on the limiting pieces respectively; the wiring part is interfaced with the socket on the end cover; and the heating device is connected with the socket on the end cover.

Preferably, the case is opened with a plurality of round holes; a power connector and a wiring plug on the controller in the case are all placed in the round holes respectively; the heating wires, the heating device, the atomizing film and the temperature and humidity sensor are all connected with the controller through connecting wires; and the wiring part is also connected with the controller through connecting wires.

Preferably, an upper edge of the case is buckled with an upper cover via buckling.

Preferably, the connector sleeves the end of the mist outlet; the mist outlet is provided with an annular step; and the sealing ring is arranged between the annular step and the connector.

Preferably, the heating device is a spiral heating wire.

Preferably, the heating wires of the pipe body are arranged inside the pipe body, or wound in a recessed slot on an outer wall of the pipe body, or embedded between an inner mold and protruding ribs.

A heating and humidifying method of said heating and dehumidifying device, comprising the following steps:

(1) filling the tank body with water through the water supply pipe until the water pushes up the floating upper cover such that the plug enters a space enclosed by the thickened step whereby the cushion pad on the plug corks an end of the water supply pipe to stop adding water; wherein the water supply pipe is configured to be connected to a water bag; then the water in the tank body enters the mist outlet, and the atomizing film atomizes the water into water droplets, and the water droplets enter into a space interior to the inner chamber sheet; thereby completing a water injection and atomization step;

(2) importing gas for breathing through the gas inlet into the steam generator, preheating the gas at the gaps between the evaporation chamber and the inner chamber sheet; then the preheated gas enters into the space interior to the inner chamber sheet from the gas passage at the opening side of the evaporation chamber proximal to the end cover, so that the gas along with the water droplets atomized by the atomizing film move towards the gas outlet; and during movement of the gas along with the water droplets, the gas and the water droplets are heated by the heating device until the water droplets are completely vaporized to obtain unsaturated steam with temperature higher than a normal temperature so that the steam at the gas outlet is in an unsaturated state; thereby completing a water droplets vaporization step;

(3) outputting the steam from the gas outlet and transporting the steam through the pipe body; during transportation, the heating wires of the pipe body are capable of providing supplementary heating of the steam when the steam is decreased in temperature caused by ambient temperature; once the steam is output from the Y-shaped connector, the steam is ready for use by a patient, thereby completing a heat preserved steam outputting step; in this step 3, when temperature of the steam decreases during transportation, an absolute humidity of the steam remains unchanged but a relative humidity gradually increases; when the steam reaches the patient, the relative humidity of the steam is close to saturation; since the steam gradually changes from an unsaturated state to a nearly saturated state during movement towards the patient, no condensed water will not be produced in the pipe body.

The benefits of this invention are:

1. The water tank atomization set and the steam generator are connected through insertion and buckling to render convenient disassembly and assembly, maintenance, cleansing, disinfection and sterilization.

2. The floating upper cover and the floating lower cover are provided in the pipe body. The buoyancy of water pushes the plug of the floating upper cover to the end of the water supply pipe, so that water is supplied during shortage and the supply stops when the water is full;

3. The steam generator is designed to comprise the internal layer and the external layer separated from each other. The gas for breathing enters from the gas inlet is preheated in the gaps between the evaporation chamber and the inner chamber sheet. The preheated gas then enters the interior of the inner chamber sheet from the gas passage and mixes with the heated and vaporized water to form unsaturated steam with higher temperature than normal. The steam is discharged from the gas outlet, and no condensed water is produced;

4. The design of the temperature and humidity monitoring holes on the quick connector and the Y-shaped connector provide real-time monitoring of the temperature and humidity for the controller to control the temperature of the heating wire in the pipe body, the amount of water vapour atomized on the atomizer and the temperature of the heating device, so to obtain water mist suitable for breathing.

DETAILED DESCRIPTION OF THE INVENTION

Figure 1:
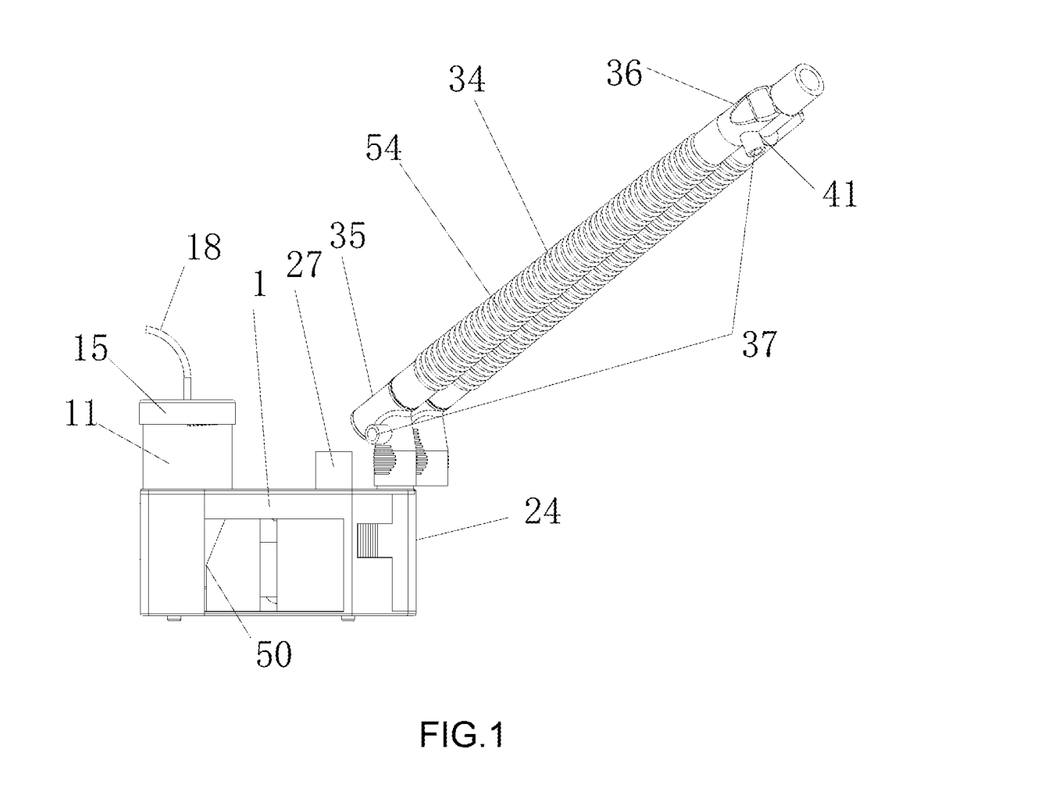
FIG. 1 is a perspective view of this invention.
Figure 2:
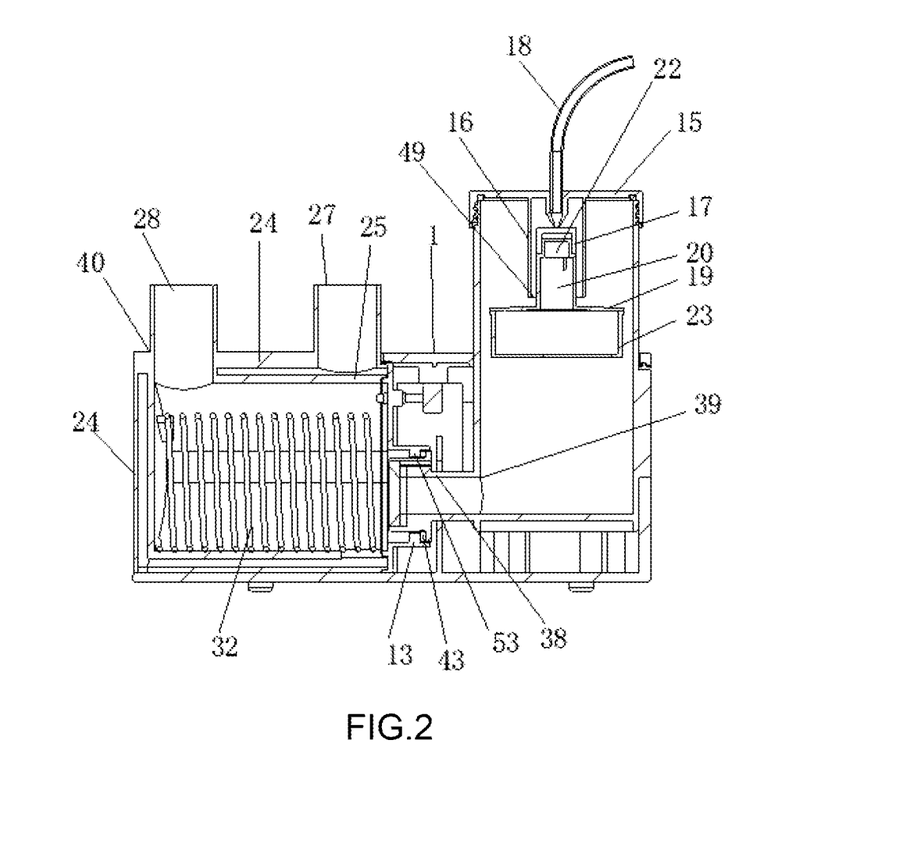
FIG. 2 is a cross-sectional view showing the interior of the case of this invention.
Figure 3:
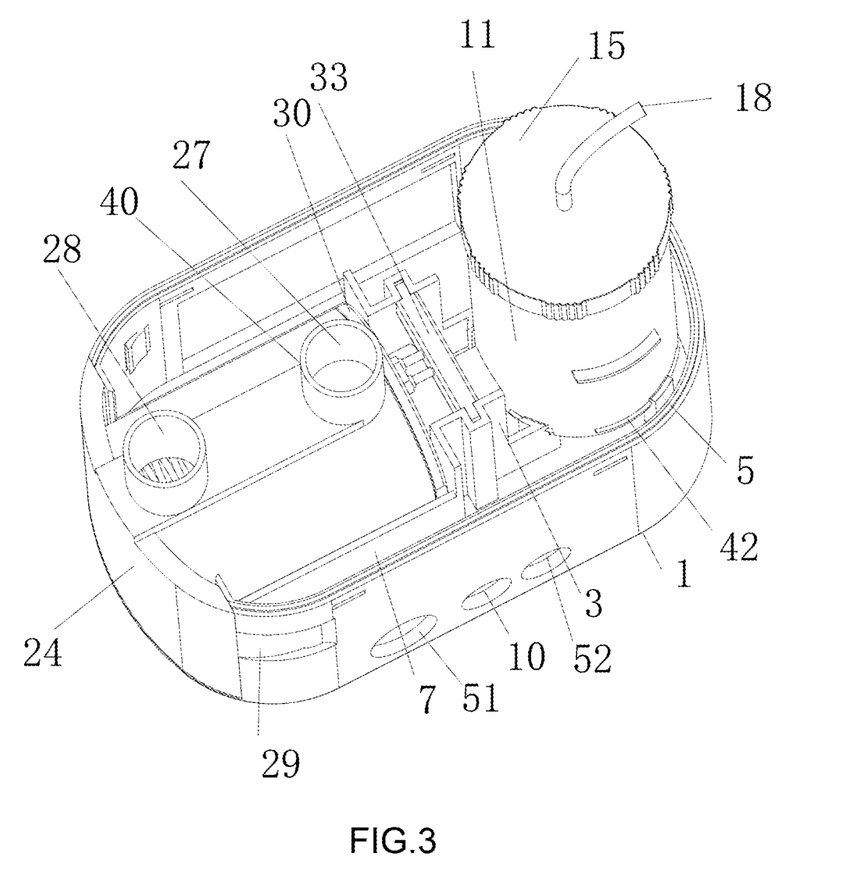
FIG. 3 is a schematic diagram of the internal structure of the case of this invention.
Figure 4:
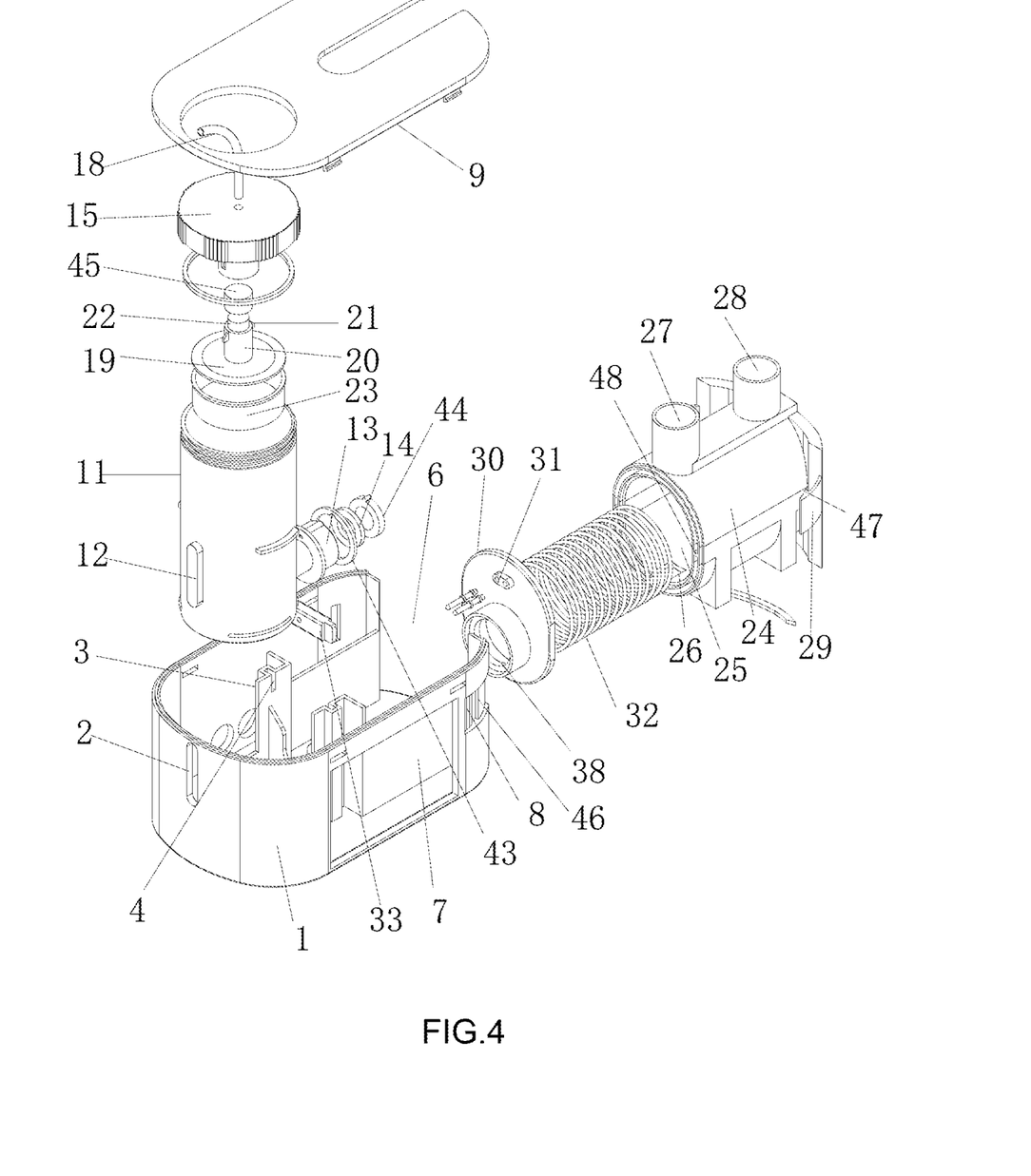
FIG. 4 is an exploded view of the water tank atomization set and the steam generator of this invention.

As shown in FIG. 1 to FIG. 4, a heating and humidifying device, comprising a case 1, a water tank atomization set 39, a steam generator 40, a heating breathing pipeline 41 and a controller 50. A tank body 11 of the water tank atomization set 39 is buckled with a certain number of resilient buckling pieces 5 inside the case 1 via corresponding buckling strips 42 on an outer side wall of the tank body 11; the steam generator 40 is buckled with slots 8 on two sides of the case 1 via buckling pieces 29 on two sides of the steam generator 40 respectively; a mist outlet 13 on the tank body 11 of the water tank atomization set 39 is interfaced with a connector 38 of the steam generator 40; a gas outlet 28 on the steam generator 40 is connected to the heating breathing pipeline 41;

A protruding piece 12 on one side of the tank body 11 is buckled with a buckling slot 2 on the case 1; an outer side of an end of the mist outlet 13 is sleeved with a sealing ring 43, and an atomizing film 14 is sleeved in the sealing ring 43; one side of the atomizing film 14 is padded with a top block 44; and the tank body 11 is connected to a tank cover 15 by threads; a lower surface of the tank cover 15 is provided with a water stop column 16; a water supply pipe 18 passes through the tank cover 15 and communicates with the water stop column 16; a sleeve column 20 on a floating upper cover 19 is sleeved inside the water stop column 16, and a floating lower cover 23 is provided under the floating upper cover 19;

The steam generator 40 is a design with an internal layer and an external layer separated from each other. One side of an evaporation chamber 24 of the steam generator 40 is open, and an inner chamber sheet 25 is annularly provided in the evaporation chamber 24 interior to the internal layer. The inner chamber sheet 25 is provided with a gas passage 26 at an opening side of the evaporation chamber 24, and the evaporation chamber 24 is connected to a gas inlet 27; the inner chamber sheet 25 is connected to a gas outlet 28; an end cover 30 is provided on the opening side of the evaporation chamber 24; a socket 31 is provided on the end cover 30; and a heating device 32 is provided on one side of the end cover 30;

The gas outlet 28 of the steam generator 40 is connected with a quick connector 35 at a proximal end of a pipe body 34 of the heating breathing pipeline 41; a Y-shaped connector 36 at a far end of the heated breathing pipeline 41 is configured to be connected with a patient; the pipe body 34 is provided with heating wires; temperature and humidity monitoring holes 37 are provided on the quick connector 35 and the Y-shaped connector 36 respectively; the temperature and humidity monitoring holes 37 are connected with a temperature and humidity sensor on the controller in the case 1; the temperature and humidity monitoring holes 37 on the quick connector 35 and the Y-shaped connector 36 provide real-time feedback on steam temperature and humidity, and the controller 50 controls power of the heating wires of the pipe body 34, an amount of atomized water from the atomizing film 14, and a power of the heating device 32, so as to obtain the steam with suitable temperature and humidity.

An inner wall of the water stop column 16 below the tank cover 15 is annularly provided with a thickened step 17; an annular sheet 49 is provided under the water stop column 16; an inner hole of the annular sheet 49 is provided with toothed openings; and the sleeve column 20 of the floating upper cover 19 is provided with two limiting teeth 21 corresponding to the toothed openings; an upper end of the sleeve column 20 is provided with a plug 22; a cushion pad 45 is provided on the top of the plug 22. The limiting teeth 21 on the sleeve column 20 pass through the toothed openings and are placed between the annular sheet 49 and the thickened step 17. The evaporation chamber 24 is placed between two clips 7 at an opening 6 of the case 1; the buckling pieces 29 are provided on both sides of the evaporation chamber 24 respectively; the buckling pieces 29 are buckled with first teeth 46 on the slots 8 on both sides of case 1 through second teeth 47 of the buckling pieces 29; the evaporation chamber 24 is placed in the case 1; an edge at an end of the inner chamber sheet 25 is buckled with a slot on the end cover 30; the heating device 32 is placed interior to the inner chamber sheet 25, and separation sheets 48 are provided at both sides of the inner chamber sheet 25 respectively to separate the inner chamber sheet from the evaporation chamber 24; the separation sheets 48 define gaps between the evaporation chamber 24 and the inner chamber sheet 25; and an interior of the evaporation chamber 24 is hollow. Limiting pieces 3 are symmetrically provided inside the case 1, and the limiting pieces 3 are symmetrically provided with grooves 4; a gap is provided between two limiting pieces 3; the mist outlet 13 of the tank body 11 is placed in the gap; both sides of a wiring part 33 are buckled with the grooves 4 on the limiting pieces 3 respectively; the wiring part 33 is interfaced with the socket 31 on the end cover 30; and the heating device 32 is connected with the socket 31 on the end cover 30. The case 1 is opened with a certain number of round holes 10; a power connector 51 and a wiring plug 52 on the controller in the case 1 are all placed in the round holes 10 respectively; the heating wires, the heating device 32, the atomizing film 14 and the temperature and humidity sensor are all connected with the controller 50 through connecting wires; and the wiring part 33 is also connected with the controller 50 through connecting wires. An upper edge of the case 1 is buckled with an upper cover 9 via buckling. The connector 38 sleeves the end of the mist outlet 13; the mist outlet 13 is provided with an annular step 53; and the sealing ring 43 is arranged between the annular step 53 and the connector 38. The heating device 32 is a spiral heating wire. The heating wires of the pipe body 34 can be arranged inside the pipe body 34, wound in a recessed slot on an outer wall of the pipe body 34, or embedded between an inner mold and protruding ribs 54.

A heating and humidifying method for a heating and humidifying device, in which the specific steps are as follows: (1) filling the tank body 11 with water through the water supply pipe 18 until the water pushes up the floating upper cover 19 such that the plug 22 enters a space enclosed by the thickened step 17 whereby the cushion pad 45 on the plug 22 corks an end of the water supply pipe 18 to stop adding water; wherein the water supply pipe 18 is configured to be connected to a water bag; then the water in the tank body 11 enters the mist outlet 13, and the atomizing film 14 atomizes the water into small water droplets, and the small water droplets enter into a space interior to the inner chamber sheet 25; thereby completing a water injection and atomization step; (2) importing gas for breathing through the gas inlet 27 into the steam generator, preheating the gas at the gaps between the evaporation chamber 24 and the inner chamber sheet 25; then the preheated gas enters into the space interior to the inner chamber sheet 25 from the gas passage 26 at the opening side of the evaporation chamber 24 proximal to the end cover 30, so that the gas along with the small water droplets atomized by the atomizing film 14 directly move towards the gas outlet 28; and during movement of the gas along with the small water droplets, the gas and the small water droplets are heated by the heating device 32 until the small water droplets are completely vaporized to obtain unsaturated steam with temperature higher than a normal temperature so that steam at the gas outlet 28 is in an unsaturated state; thereby completing a water droplets vaporization step; (3) outputting the steam from the gas outlet 28 and transporting the steam through the pipe body 34; during transportation, the steam is potentially affected by ambient temperature, but the heating wires of the pipe body 34 are used for supplementary heating; the steam output from the Y-shaped connector 36 is ready for use by a patient, thereby completing a heat preserved steam outputting step. In this step 3, when temperature decreases, the absolute humidity of the steam remains unchanged but the relative humidity gradually increases. When the steam reaches the patient's end, its relative humidity is close to saturation. As the steam gradually changes from an unsaturated state to a nearly saturated state during movement towards the patient, no condensed water will not be produced in the pipe body 34.

The tank body 11 is buckled with a certain number of resilient buckling pieces 5, and the protruding piece 12 is also buckled to the buckling slot 2 for position limiting purpose. The steam generator 40 is inserted into the case 1 from the opening 6, clamped by the two clips 7 and being connected with the slots 8 of the case 1 by buckling via the buckling pieces 29 for easy disassembly and assembly. The limiting teeth 21 on the sleeve column 20 of the floating upper cover 19 are sleeved by the toothed openings of the annular sheet on the water stop column 16 to prevent the floating upper cover from falling when there is no water. After the tank body 11 is fully filled with water, the water pushes the plug 22 above the sleeve column 20 to cork the water supply pipe 18. As such, water is supplied during shortage and the supply stops when water is full. There are gaps between the evaporation chamber 24 and the inner chamber sheet 25; separating sheets 48 are provided at both sides of the inner chamber sheet 25 between the inner chamber sheet 25 and the evaporation chamber 24. A gas passage 26 is provided on the inner chamber sheet 25 at the opening side of the evaporation chamber 24. As the space interior to the inner chamber sheet 25 is heated, the gas for breathing is preheated in the gaps between the evaporation chamber 24 and the inner chamber sheet 25. Further, gas moving in U-shaped paths is preheated better. The evaporation chamber 24 itself is designed with an internal layer and an external layer, which provide good heat insulation and prevents scalding due to a heat insulating hollow space between the internal layer and the external layer. The gas enters the space interior to the inner chamber sheet 25 via the gas passage 26, and gradually moves toward the gas outlet 28 along with the small water droplets yet to be vaporized. During movement of the gas along with the small water droplets towards the gas outlet 28, the heating device 32 heats up the small water droplets, which are then vaporized, and the resulting steam obtained is output from the gas outlet 28 in an unsaturated state. The quick connector 35 of the pipe body 34 and the Y-shaped connector 36 are each provided with a temperature and humidity detection hole 37 to monitor the temperature and humidity in real time, so that the controller 50 can control the power of the heating wires of the pipe body 34, the amount of atomized water droplets from the atomizing film 14 and the power of the heating device 32 to obtain the steam with suitable temperature and humidity for breathing;

Through the humidifying method of the heating and humidifying device, the water droplets are heated by the steam generator 40 until it is completely vaporized. The advantages of this method include a large relative heating area of the water droplets, uniform heating and quick vaporization. Humidification through the control by the atomizing film 14 is precise to achieve the purpose of heating and humidifying the steam in the pipeline. The steam at the gas outlet 28 of the steam generator 40 has a higher temperature than room temperature and a lower relative humidity. It is also in an unsaturated state. The absolute humidity of the steam in the pipe body 34 after being heated and humidified does not change, but the movement of the steam towards the patient is a process in which the temperature gradually decreases while the relative humidity gradually increases. Since the humidity of the steam at the inlet end of the pipe body 34 is in an unsaturated state, the relative humidity will gradually increase as the temperature of the steam in the pipe body 34 gradually decreases. Controlling the temperature difference between the inlet and outlet ends of the pipe body 34 ensures that the relative humidity of the steam is close to saturation only at the outlet end of the pipe body 34. Since the humidity of the steam in the pipe body 34 is in an unsaturated state during the entire movement of the steam towards the outlet end of the pipe body, there is no condensed water generated.

Although specific embodiments of the invention have been described above, it should be understood by those skilled in the art that the specific embodiments described are illustrative of the principle of the present invention only and do not limit the scope of the invention. Any modifications or changes made by a person skilled in this field of art in accordance with the teachings of this invention without deviating from the scope of this invention should also fall within the scope of protection of this invention. The scope of protection claimed by the present invention is defined by the appended claims and their equivalents.

What is claimed is:

1. A heating and humidifying device, comprising a case (1), a water tank atomization set (39), a steam generator (40), a heating breathing pipeline (41) and a controller (50); wherein a tank body (11) of the water tank atomization set (39) is buckled with resilient buckling pieces (5) inside the case via corresponding buckling strips (42) on an outer side wall of the tank body (11); the steam generator (40) is buckled with slots (8) on two sides of the case via buckling pieces (29) on two sides of the steam generator (40) respectively; a mist outlet (13) on the tank body (11) of the water tank atomization set (39) is interfaced with a connector (38) of the steam generator (40); a gas outlet (28) on the steam generator (40) is connected to the heating breathing pipeline (41);

a protruding piece (12) on one side of the tank body (11) is buckled with a buckling slot (2) on the case (1); an outer side of an end of the mist outlet (13) is sleeved with a sealing ring (43), and an atomizing film (14) is sleeved in the sealing ring; one side of the atomizing film (14) is padded with a top block (44); and the tank body (11) is connected to a tank cover (15) by threads; a lower surface of the tank cover (15) is provided with a water stop column (16); a water supply pipe (18) passes through the tank cover (15) and communicates with the water stop column (16); a sleeve column (20) is sleeved inside the water stop column (16), and the sleeve column (20) is connected with a floating upper cover (19); a floating lower cover (23) is provided under the floating upper cover (19);

the steam generator (40) has an internal layer and an external layer separated from each other;

the steam generator (40) has an evaporation chamber (24); one side of the evaporation chamber (24) is open, and an inner chamber sheet (25) is annularly provided in the evaporation chamber (24) interior to the internal layer; the inner chamber sheet (25) is provided with a gas passage (26) at an opening side of the evaporation chamber (24), and the evaporation chamber (24) is connected to a gas inlet (27); the inner chamber sheet (25) is connected to the gas outlet (28); an end cover (30) is provided on the opening side of the evaporation chamber (24); a socket (31) is provided on the end cover (30); and a heating device (32) is provided on one side of the end cover (30);

the gas outlet (28) of the steam generator (40) is connected with a quick connector (35) at a proximal end of a pipe body (34) of the heating breathing pipeline (41); a Y-shaped connector (36) is provided at a far end of the heated breathing pipeline (41) and is configured to be connected with a patient; the pipe body (34) is provided with heating wires; temperature and humidity monitoring holes (37) are provided on the quick connector (35) and the Y-shaped connector (36) respectively; the temperature and humidity monitoring holes (37) are connected with a temperature and humidity sensor on the controller (50) in the case (1); the temperature and humidity monitoring holes (37) on the quick connector (35) and the Y-shaped connector (36) provide real-time feedback on steam temperature and humidity, and the controller (50) controls power of the heating wires of the pipe body (34), an amount of atomized water from the atomizing film (14), and a power of the heating device (32), so as to obtain the steam with suitable temperature and humidity.

2. The heating and humidifying device of claim 1, wherein an inner wall of the water stop column (16) below the tank cover (15) is annularly provided with a thickened step (17); an annular sheet (49) is provided under the water stop column (16); an inner hole of the annular sheet (49) is provided with toothed openings; and the sleeve column (20) of the floating upper cover (19) is provided with two limiting teeth (21) corresponding to the toothed openings; an upper end of the sleeve column (20) is provided with a plug (22); a cushion pad (45) is provided on a top of the plug (22); the limiting teeth (21) on the sleeve column (20) pass through the toothed openings and are placed between the annular sheet (49) and the thickened step (17).

3. The heating and humidifying device of claim 2, wherein the evaporation chamber (24) is placed between two clips (7) at an opening (6) of the case (1); the buckling pieces (29) are provided on both sides of the evaporation chamber (24) respectively; the buckling pieces (29) are buckled with first teeth (46) on the slots (8) on both sides of case (1) through second teeth (47) of the buckling pieces (29); the evaporation chamber (24) is placed in the case (1); an edge at an end of the inner chamber sheet (25) is buckled with a slot on the end cover (30); the heating device (32) is placed interior to the inner chamber sheet (25), and separation sheets (48) are provided at both sides of the inner chamber sheet (25) respectively to separate the inner chamber sheet (25) from the evaporation chamber (24); the separation sheets (48) define gaps between the evaporation chamber (24) and the inner chamber sheet (25); and an interior of the evaporation chamber (24) is hollow.

4. The heating and humidifying device of claim 1, wherein two limiting pieces (3) are symmetrically provided inside the case (1), and the limiting pieces (3) are symmetrically provided with grooves (4); a gap is provided between the two limiting pieces (3); the mist outlet (13) of the tank body (11) is placed in the gap; a wiring part (33) is connected to the limiting pieces (3) by having both sides of the wiring part (33) buckled with the grooves (4) on the limiting pieces (3) respectively; the wiring part (33) is interfaced with the socket (31) on the end cover (30); and the heating device (32) is connected with the socket (31) on the end cover (30).

5. The heating and humidifying device of claim 1, wherein the case (1) is opened with a plurality of round holes (10); a power connector (51) and a wiring plug (52) on the controller in the case (1) are all placed in the round holes (10) respectively; the heating wires, the heating device (32), the atomizing film (14) and the temperature and humidity sensor are all connected with the controller through connecting wires; and the wiring part (33) is also connected with the controller through connecting wires.

6. The heating and humidifying device of claim 1, wherein an upper edge of the case (1) is buckled with an upper cover (9) via buckling.

7. The heating and humidifying device of claim 1, wherein the connector (38) sleeves the end of the mist outlet (13); the mist outlet (13) is provided with an annular step (53); and the sealing ring (43) is arranged between the annular step (53) and the connector (38).

8. The heating and humidifying device of claim 1, wherein the heating device (32) is a spiral heating wire.

9. The heating and humidifying device of claim 1, wherein the heating wires of the pipe body (34) are arranged inside the pipe body (34), or wound in a recessed slot on an outer wall of the pipe body (34), or embedded between an inner mold and protruding ribs (54).

10. A heating and humidifying method of the heating and humidifying device of claim 3, wherein the method comprises the following steps:

(1) filling the tank body (11) with water through the water supply pipe (18) until the water pushes up the floating upper cover (19) such that the plug (22) enters a space enclosed by the thickened step (17) whereby the cushion pad (45) on the plug (22) corks an end of the water supply pipe (18) to stop adding water; wherein the water supply pipe (18) is configured to be connected to a water bag; then the water in the tank body (11) enters the mist outlet (13), and the atomizing film (14) atomizes the water into water droplets, and the water droplets enter into a space interior to the inner chamber sheet (25); thereby completing a water injection and atomization step;

(2) importing gas for breathing through the gas inlet (27) into the steam generator, preheating the gas at the gaps between the evaporation chamber (24) and the inner chamber sheet (25); then the preheated gas enters into the space interior to the inner chamber sheet (25) from the gas passage (26) at the opening side of the evaporation chamber (24) proximal to the end cover (30), so that the gas along with the water droplets atomized by the atomizing film (14) move towards the gas outlet (28); and during movement of the gas along with the water droplets, the gas and the water droplets are heated by the heating device (32) until the water droplets are completely vaporized to obtain unsaturated steam with temperature higher than a normal temperature so that the steam at the gas outlet (28) is in an unsaturated state; thereby completing a water droplets vaporization step;

(3) outputting the steam from the gas outlet (28) and transporting the steam through the pipe body (34); during transportation, the heating wires of the pipe body (34) are capable of providing supplementary heating of the steam when the steam is decreased in temperature caused by ambient temperature; once the steam is output from the Y-shaped connector (36), the steam is ready for use by a patient, thereby completing a heat preserved steam outputting step; in this step 3, when temperature of the steam decreases during transportation, an absolute humidity of the steam remains unchanged but a relative humidity gradually increases; when the steam reaches the patient, the relative humidity of the steam is close to saturation; since the steam gradually changes from an unsaturated state to a nearly saturated state during movement towards the patient, no condensed water is produced in the pipe body (34).

\* \* \* \* \*